W. A. GWYNN.
VULCANIZER.
APPLICATION FILED MAR. 25, 1918.
1,336,220. Patented Apr. 6, 1920.
2 SHEETS—SHEET 1.
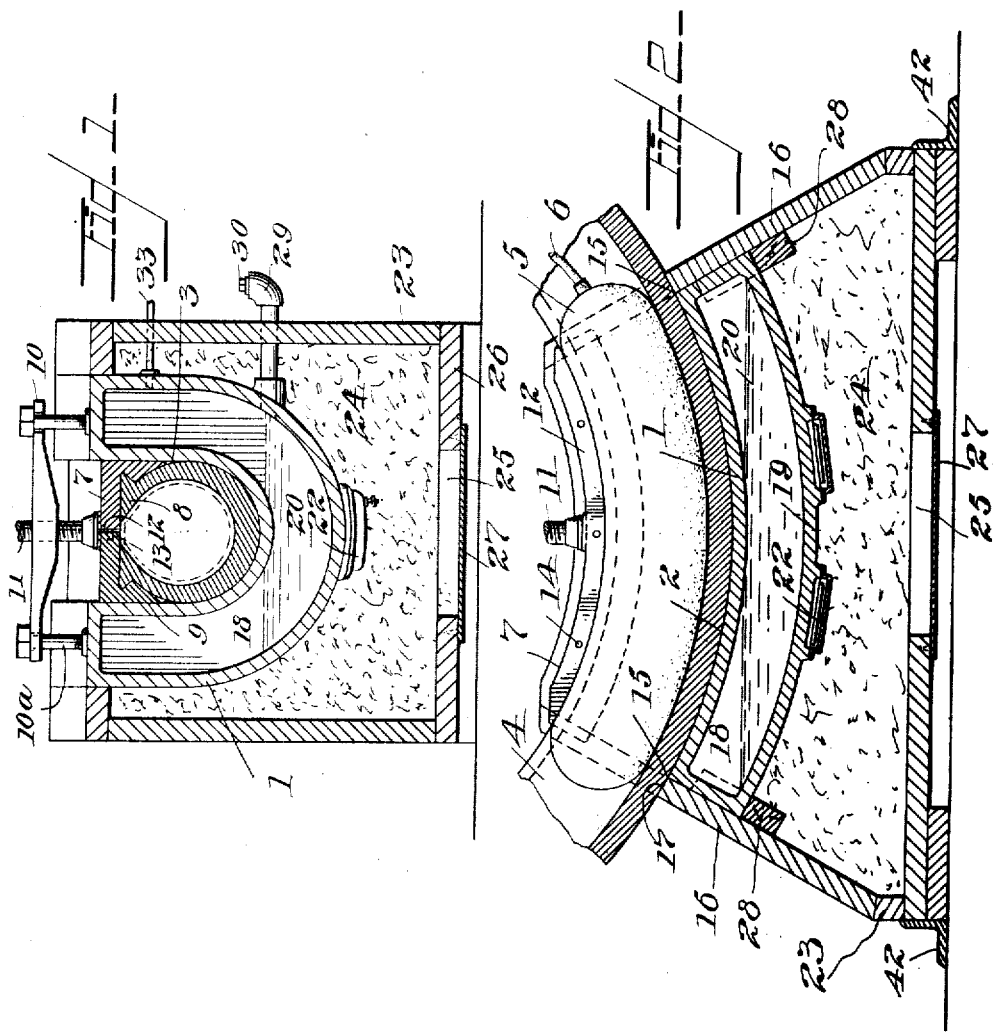
INVENTOR
William A. Gwynn
BY
ATTORNEY

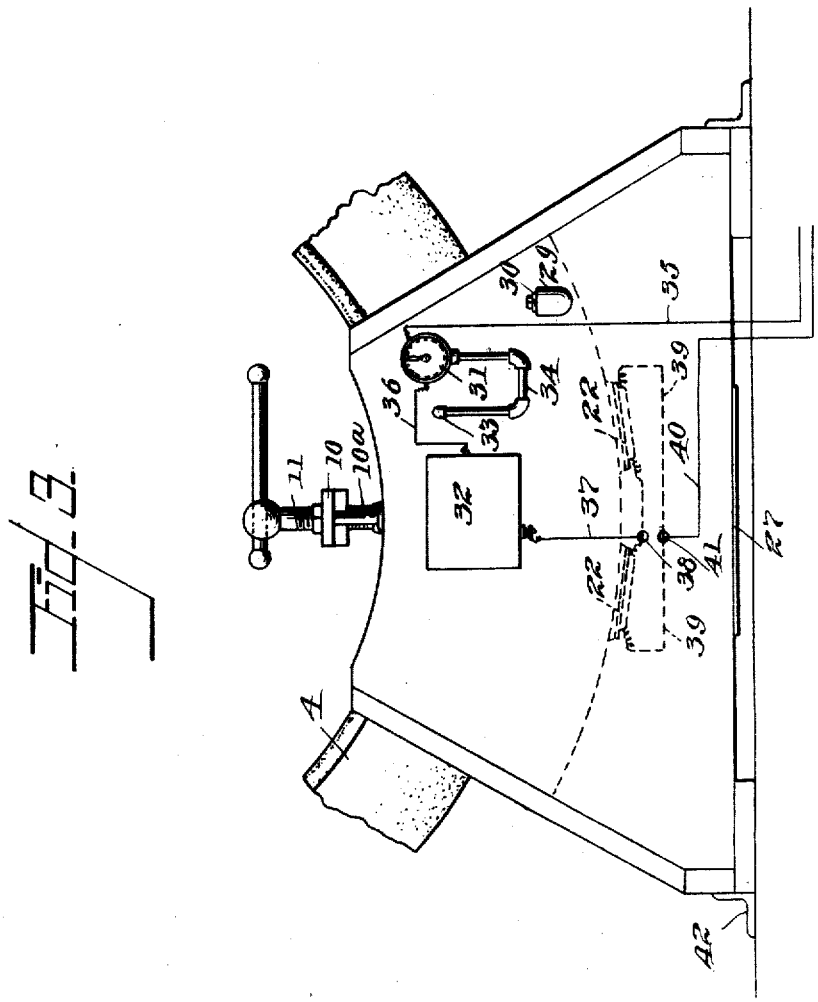

UNITED STATES PATENT OFFICE.

WILLIAM A. GWYNN, OF ST. LOUIS, MISSOURI, ASSIGNOR TO SUSIE F. GWYNN, OF ST. LOUIS, MISSOURI.

VULCANIZER.

1,336,220.  Specification of Letters Patent.  Patented Apr. 6, 1920.

Application filed March 25, 1918. Serial No. 224,481.

*To all whom it may concern:*

Be it known that I, WILLIAM A. GWYNN, a citizen of the United States, residing in the city of St. Louis and State of Missouri, have invented new and useful Improvements in Vulcanizers, of which the following is a specification.

This invention relates to vulcanizing devices and particularly to that type used in making repairs, and in which only a portion of the article is vulcanized. Such vulcanizers are used for vulcanizing automobile tires. The heated vulcanizing body is provided with a face against which the article to be vulcanized is pressed. As considerable force is exerted to force the article against the vulcanizing face it frequently happens that ridges are formed in the surface of the article at the ends of the vulcanizing body. Such ridges are objectionable. The general object of the present invention is to provide a vulcanizing device which is of very simple construction, but which will operate to prevent the formation of the ridges referred to above. A further object of the invention is to produce a vulcanizing device having a construction especially adapted to impart and conserve the heat which is used to heat the article being vulcanized. Further objects of the invention will appear hereinafter.

The invention consists in the general combination of parts and features to be particularly described hereinafter, all of which contribute to produce a simple and efficient vulcanizing device. A preferred embodiment of my invention will be particularly described in the following specification while the broad scope of my invention will be pointed out in the appended claims.

In the drawing Figure 1 is a vertical cross-section through a vulcanizing device embodying my invention.

Fig. 2 is a longitudinal vertical section through the vulcanizing device shown in Fig. 1, and Fig. 3 is a side elevation.

Referring more particularly to the parts, the vulcanizing device comprises a vulcanizer body 1, which is preferably formed of a heat-conductive material such as cast iron. This vulcanizer body is provided with a vulcanizing face 2 which may have any form adapting it to special requirements of the vulcanizer. In the present instance the vulcanizer illustrated is intended especially for vulcanizing automobile tires, for which reason the vulcanizing face 2 forms the bottom of a substantially U-shaped pocket 3 (see Fig. 1); and this face is also concave in a longitudinal direction of the vulcanizer so as to adapt it to fit approximately to the curvature of the tread of the tire 4 which is to be vulcanized.

In the vulcanizing operation, the tire is put in place in the pocket, and within the tire, at this point, there is placed a cushion which may be in the form of an elongated pneumatic bag 5 which is supplied with compressed air through an inflating tube 6. In this bag, the pressure is maintained so that it fills out the interior of the tire and tends to expand the tire in the U-shaped pocket. This cushion is for the purpose of applying pressure uniformly to the tire to press it against the vulcanizing face 2. In order to develop considerable pressure for this purpose a pair of shoes 7 are provided (see Fig. 1) which have a cross-section adapting them to fit the edges 8 of the tire. These shoes are preferably formed of metal and are intended to move downwardly on the vertical guide faces 9 of the U-shaped pocket. In order to press them down with considerable force, a bridge bar 10 is provided which extends across above the pocket, said bridge bar being provided with a power screw 11, the upward thrust of which is carried by two bolts 10ª. These shoes 7 are curved longitudinally to correspond with the curvature of the tire and the vertical meeting faces 12 are provided respectively with dowel pins 13 which are received in corresponding openings 14 in the opposite shoe.

With a vulcanizer having the simple construction referred to above, it has been found, that on account of the heat and pressure exerted upon the face of the tire, there is a tendency for the transverse edges 15, which form the ends of the vulcanizing face, to form transverse ridges in the face of the tire. In order to overcome this defect I provide parts of non-conducting material having faces which are substantially flush with the vulcanizing face 2. These parts are preferably in the form of pieces 16 of wood which lie against the end face of the vulcanizer body, their upper edges being provided with curved faces 17 having the same curvature as the vulcanizing face 2 and flush therewith.

In order to enable the vulcanizer body to be economically heated, it is provided with a heating chamber 18 which is of U-shape (see Fig. 1) extending up on the sides of the U-shaped pocket, and its bottom wall 19 is curved to correspond with the curvature of the vulcanizing face 2. Within this chamber 18 I provide a fluid heating-medium preferably a body of water, 20. Below the water chamber, electrical heating means is provided in the form of two heaters 22 which may be supplied with current from any suitable source.

In order to conserve the heat developed by the heating devices 22, the vulcanizer body is substantially enveloped in a non-conducting case 23. This casing is preferably simply a box constructed of wood which envelops the bottom and longitudinal sides of the vulcanizer body, so as to hold the vulcanizer body elevated above the floor, and so as to form an insulating chamber in which I pack an insulating material 24 such as asbestos. This asbestos may be packed in the casing through an opening such as the opening 25 in its bottom 26, covered by a removable plate 27. The parts 16 referred to above may form the ends of the box or casing 23. In order to support the vulcanizer body in the casing, its ends may rest on curved cleats 28 attached to the inner faces of the end walls 16 (see Fig. 2).

The water for the heating chamber 18 may be supplied through a suitable filling connection 29 provided with a removable screw plug 30. This filling connection is located at about the level indicated and is preferably in a horizontal position so that it will prevent the heating chamber 18 from being filled to too high a level.

In Fig. 3 the wiring arrangement is indicated involving the use of a steam gage 31 which coöperates with a regulator 32 to control the amount of current passing through the heaters 22. This gage is attached by means of a trap 34, to a steam connection 33 (see Fig. 1) which comes through the side wall of the device. The electric current may be led into the contacts of the steam gage by a conductor 35, and then passes by a conductor 36 to the regulator 32, and thence by a conductor 37 through the side wall of the casing at an opening 38, from which point the heaters 22 are connected up in parallel branches 39 which connect with the return wire 40 passing out through the casing at 41. In practice these two openings 38 and 41 may be combined in one, but they are illustrated in this way to simplify the wiring diagram.

In the practical operation of such vulcanizers the tires sometimes stick, or adhere to the walls of the vulcanizing pocket. In order to facilitate the disengagement of the tire under such circumstances I provide each end of the casing 23 with a transverse cleat 42 the flanges of which lie on the floor in a position to be pressed with one's foot in order to hold the casing down when the tire is pulled upwardly.

It is understood that the embodiment of the invention described herein is only one of the many embodiments my invention may take, and I do not wish to be limited in the practice of my invention nor in my claims, to the particular embodiment set forth.

What I claim is:

1. In a vulcanizing device, the combination of a heat-conductive vulcanizing body, having a vulcanizing face against which the article to be vulcanized may be pressed, and having a chamber to hold a fluid heating-medium, and a non-conducting casing enveloping the bottom and sides of said vulcanizer body and having parts with faces flush with said vulcanizing face to support the pressure of the article adjacent the edge of said vulcanizing face to prevent forming a ridge in the face of the vulcanized article.

2. In a vulcanizing device, the combination of a heat-conductive vulcanizer body having a chamber therein to hold a fluid heating-medium, said body having a pocket on its upper side with a vulcanizing face against which the article to be vulcanized may be pressed, said pocket being open at its ends to receive the article to be vulcanized, whereby the article being vulcanized may overhang the ends of the vulcanizer body, a non-conducting casing enveloping said vulcanizer body on its bottom and longitudinal sides, said casing having parts at the ends of said pocket with faces flush with said vulcanizing face for supporting the face of the article adjacent the ends of said vulcanizer body, said casing forming an insulating chamber about said vulcanizer body, and a non-conducting packing within said insulating chamber.

3. In a tire vulcanizing device, the combination of a heat-conductive vulcanizer body having a chamber therein to hold a fluid heating-medium, said body having a concave U-shaped pocket on its upper side with a vulcanizing face to receive the tire to be vulcanized, said pocket being open at its ends whereby the tire overhangs the ends of said pocket, a non-conducting casing enveloping said vulcanizer body on its bottom and longitudinal sides and having parts with faces flush with said vulcanizing face at the ends of said pocket for engaging and supporting the face of the tire, said casing forming an insulating chamber about said vulcanizer body, and a non-conducting packing within said insulating chamber.

4. In a tire vulcanizing device, the combination of a heat-conductive vulcanizer body having a chamber therein to hold a fluid heating-medium, said body having a concave U-shaped pocket on its upper side with a vulcanizing face, and open at its ends to receive the tire to be vulcanized, with portions of the tire overhanging the ends of said pocket, means for forcing the tire against the said vulcanizing face, a non-conducting casing enveloping said vulcanizer body on its bottom and longitudinal sides, said casing having parts with faces at the ends of said pocket substantially flush with said vulcanizing face, for supporting the overhanging portions of the tire.

5. In a vulcanizing device, the combination of a heat-conducting vulcanizer body having a chamber therein to hold a fluid heating-medium, said body having a pocket on its upper side to receive the article to be vulcanized, a non-conducting casing enveloping the bottom and sides of said vulcanizer body and supporting said vulcanizer body elevated above the floor, forming an insulating chamber below said vulcanizer body, an electric heater located within said insulating chamber, an insulating packing in said insulating chamber, said case having a bottom retaining said packing, and an opening through which the packing may be introduced into said insulating chamber.

6. In a tire vulcanizing device, the combination of a heat-conducting vulcanizer body having a concave U-shaped pocket on its upper side, said pocket being open at its ends so as to enable the same to receive the tire to be vulcanized, said vulcanizer body having a chamber therein to hold a fluid-heating medium, said chamber extending upwardly on the sides of said U-shaped pocket, a non-conducting casing for said vulcanizer body covering the sides thereof, and non-conducting parts disposed at the ends of said U-shaped pocket to support the article which is being vulcanized, and prevent forming ridges therein.

In testimony whereof, I have hereunto set my hand.

WILLIAM A. GWYNN.